July 18, 1939.  W. R. KOHL  2,166,761

BAG SEALING MACHINE

Filed April 7, 1937  8 Sheets-Sheet 2

July 18, 1939.   W. R. KOHL   2,166,761
BAG SEALING MACHINE
Filed April 7, 1937   8 Sheets-Sheet 3

Inventor:
William R. Kohl
By Winfield Williams
Atty.

July 18, 1939.

W. R. KOHL

2,166,761

BAG SEALING MACHINE

Filed April 7, 1937

July 18, 1939.   W. R. KOHL   2,166,761
BAG SEALING MACHINE
Filed April 7, 1937   8 Sheets-Sheet 7

Inventor:
William R. Kohl
By Winfield Williams
Atty.

Patented July 18, 1939

2,166,761

UNITED STATES PATENT OFFICE 2,166,761

BAG SEALING MACHINE

William R. Kohl, Glen View, Ill.

Application April 7, 1937, Serial No. 135,383

18 Claims. (Cl. 216—25)

My invention is a machine for the sealing of bags.

A primary object is the hermetic sealing of bags by the use of heat and pressure simultaneously applied.

A further object is the sealing of bags by the combined use of heat and pressure, in combination with a signalling means for indicating the temperature of the compressing units adequate to fuse the sealing adhesive.

Another object is the provision of a machine which mounts a continuous roll of label strip bearing a thermoplastic cement, and feeding sections of the said label strip automatically and intermittently over an open end of a bag, and sealing the same upon the said open end of the bag by pressure and predetermined heat sufficient to fuse the cementitious material between the label strip and an open end of the bag.

Other, and minor objects will be apparent.

The attached drawings are an embodiment of the said invention in which.

Figures 1, 2:
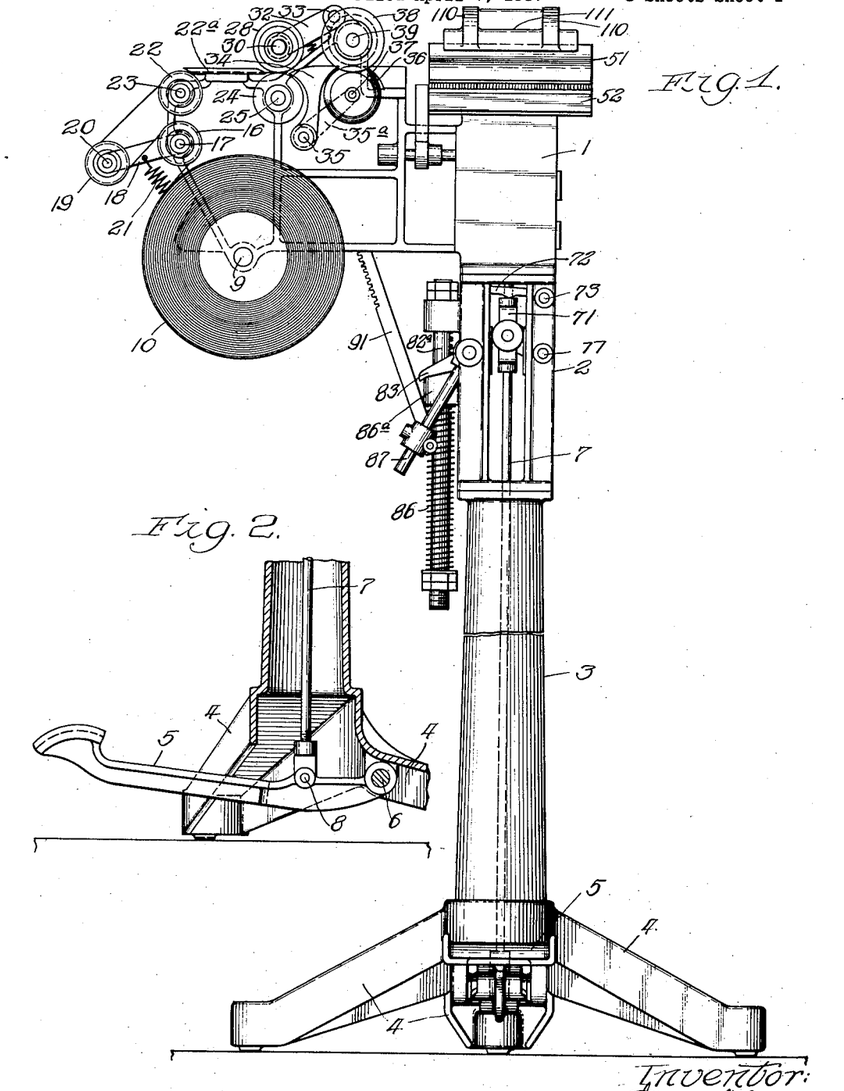
Fig. 1 is an elevation of the machine.
Fig. 2 is a sectional detail of the base of Fig. 1, illustrating the foot lever action.
Figure 3:
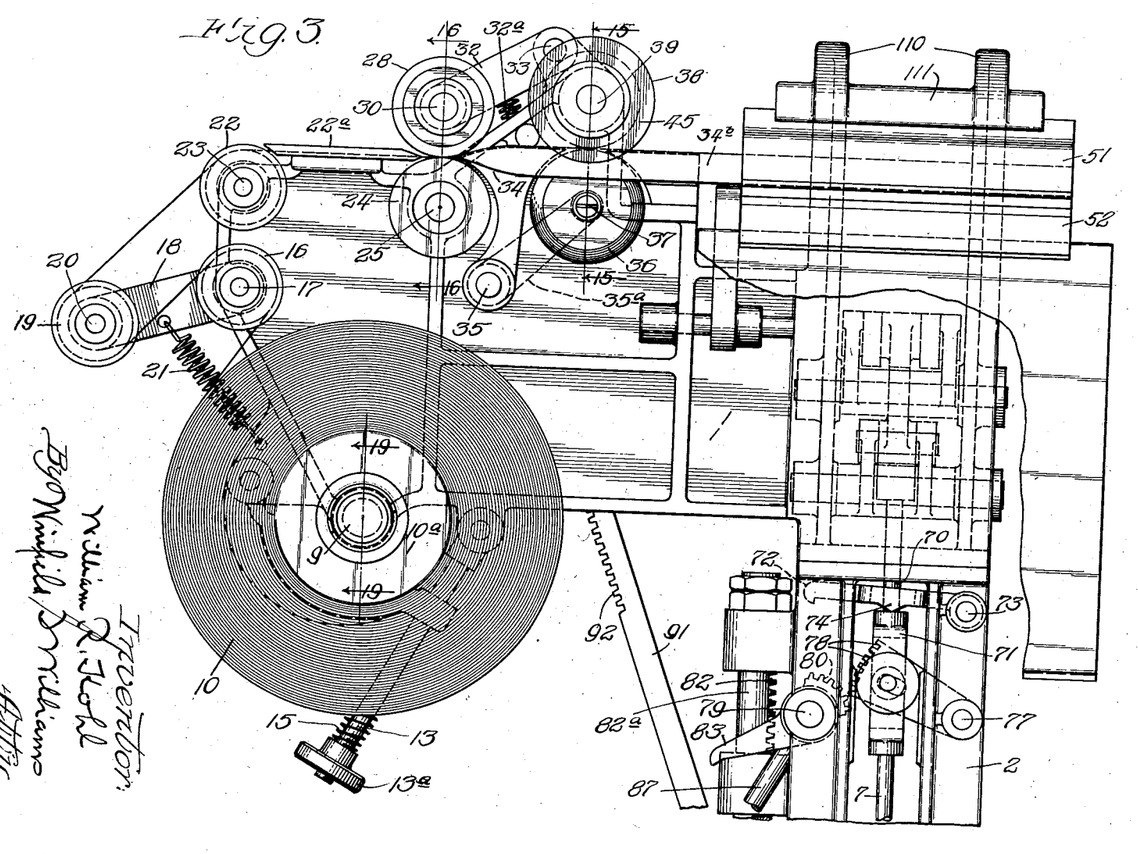
Fig. 3 is an enlarged detail of a portion of the elevation shown in Fig. 1.
Figures 4, 20:
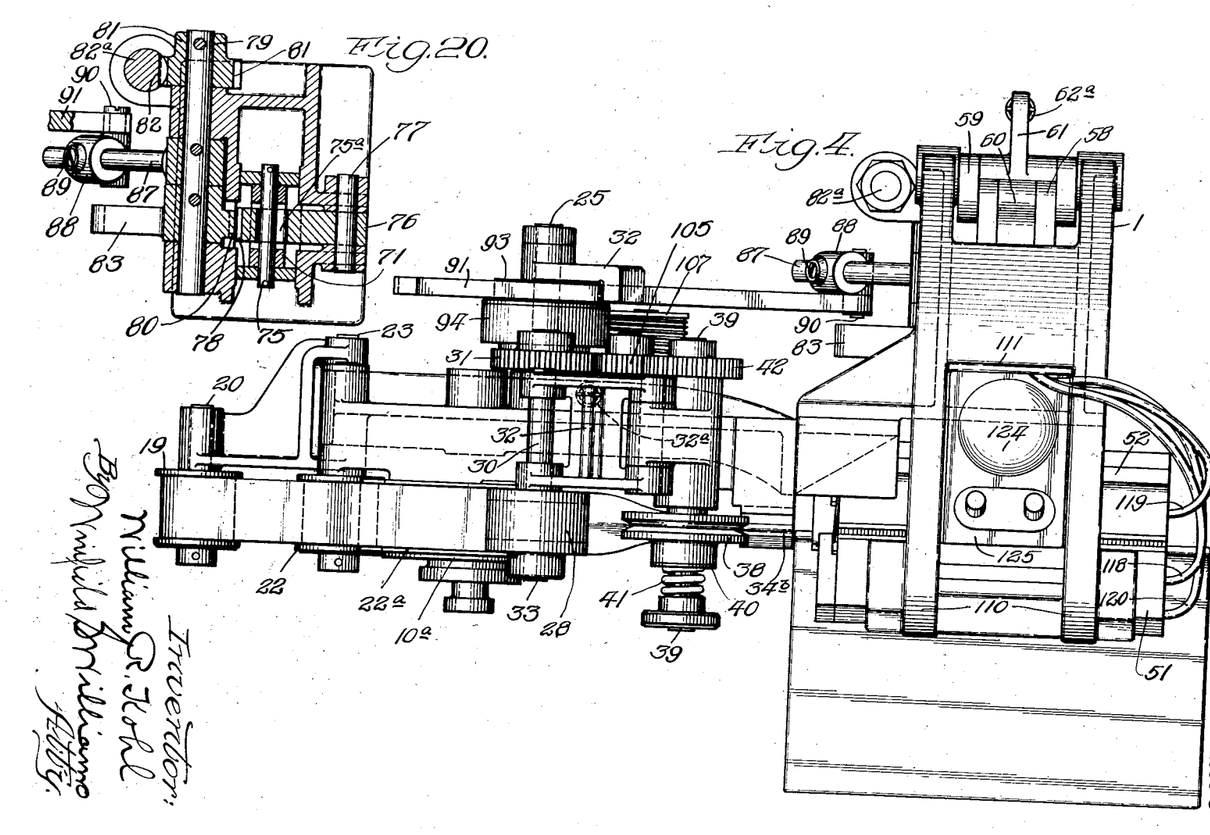
Fig. 4 is a plan detail.
Fig. 20 is a cross section of Fig. 7 along line 20—20.
Figure 5:
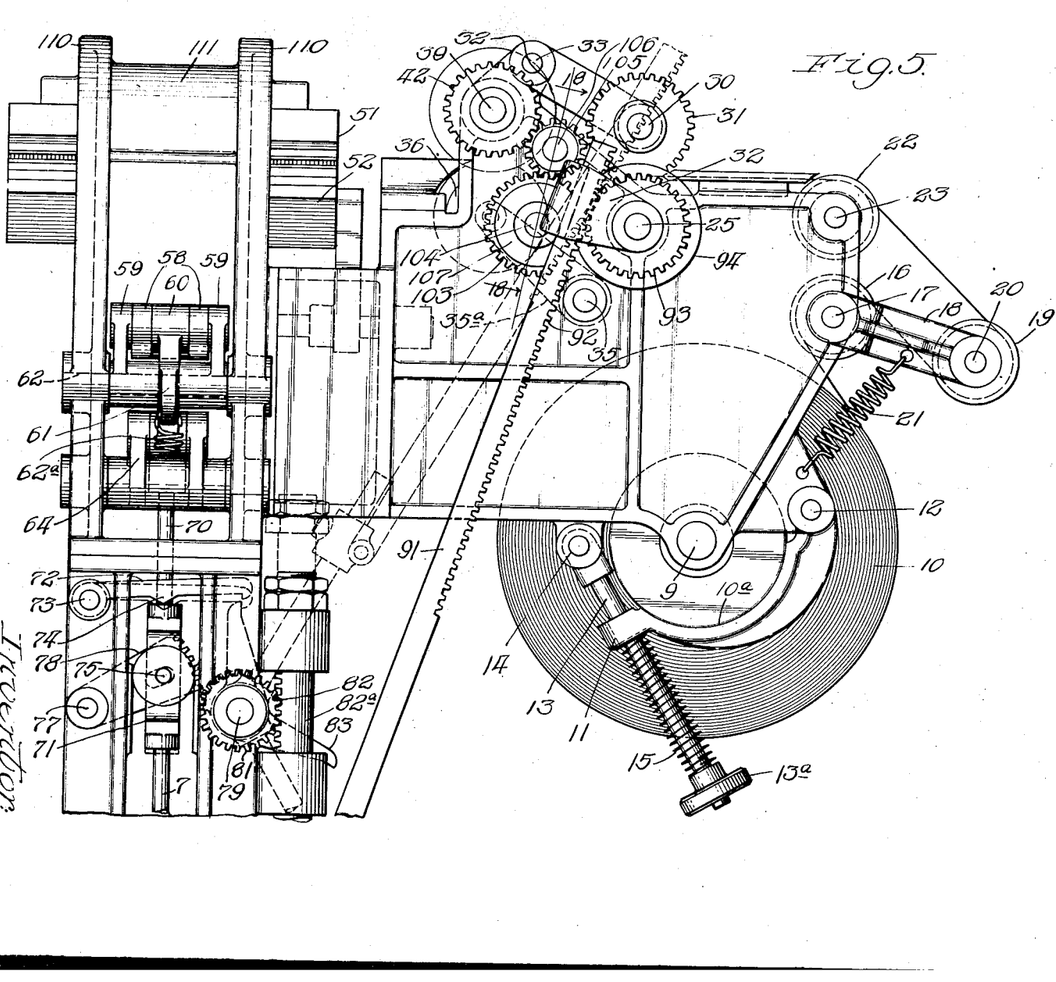
Fig. 5 is a rear view of the upper portion of Fig. 1 and is a reverse of Fig. 3.
Figures 6, 7:
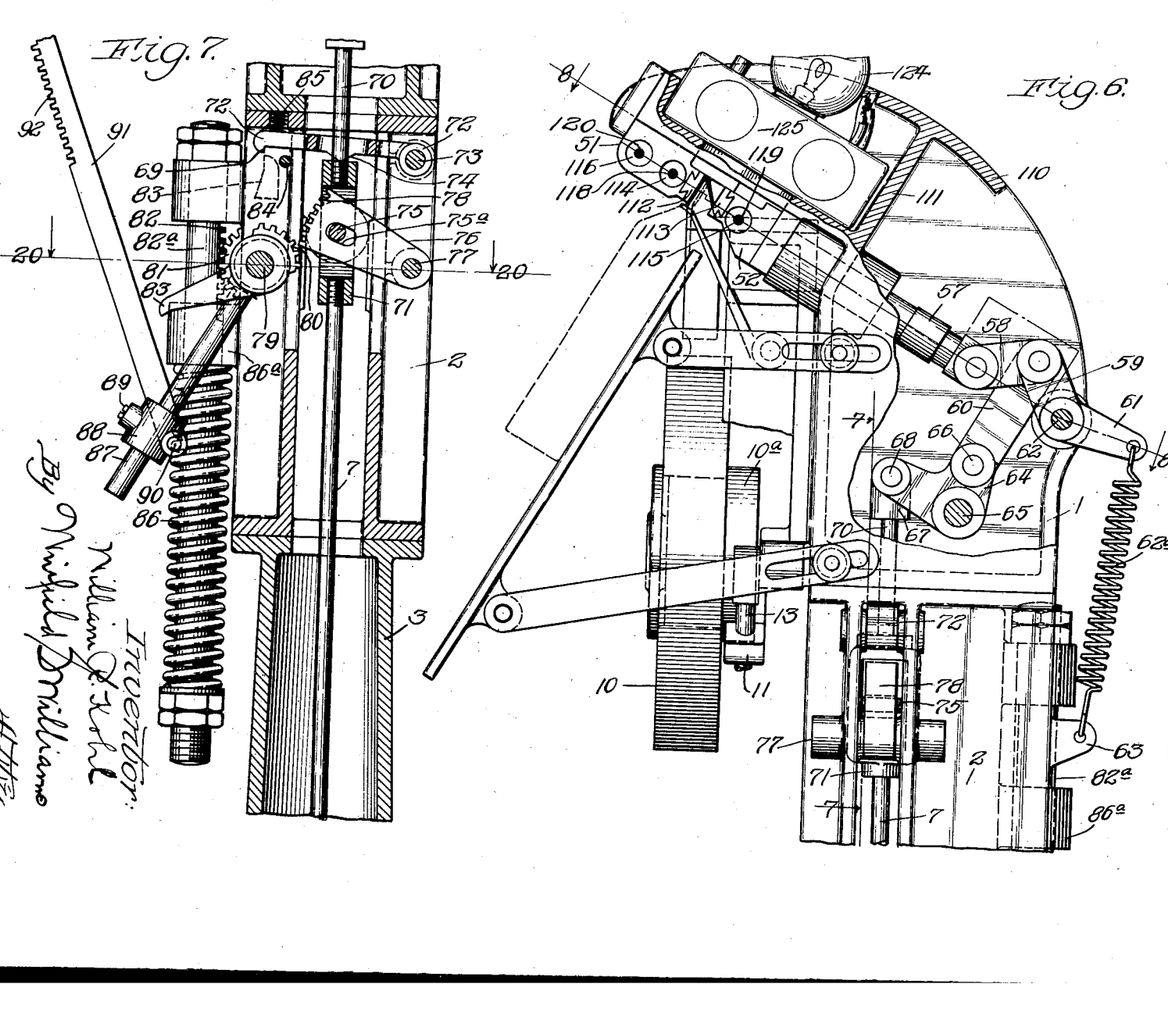
Fig. 6 is an end view from the right side of the machine illustrating the upper part of the machine shown in Fig. 1.
Fig. 7 is a sectional view of a portion of the pillar shown in Fig. 1 detailing the parts and movements of said section.
Figures 8, 9, 10, 11, 12, 13:
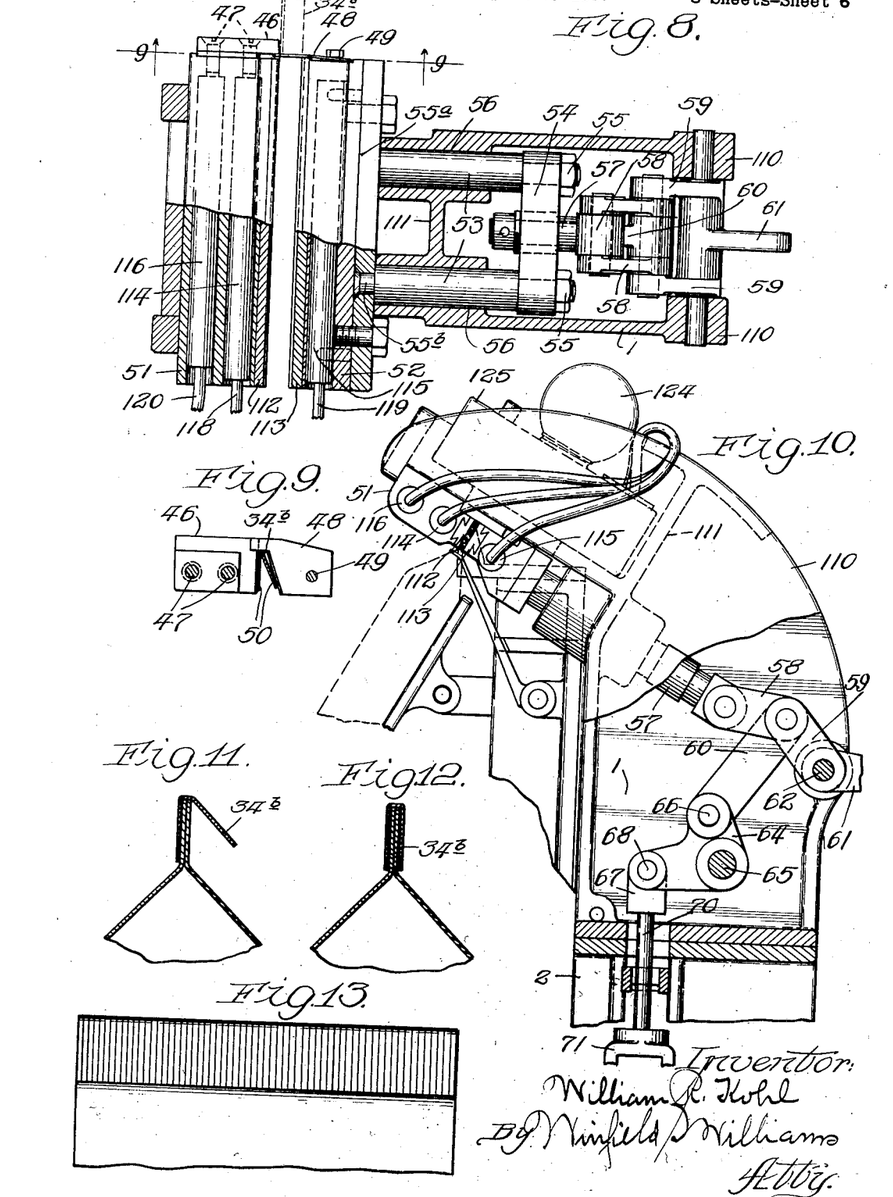
Fig. 8 is a detail of heating units and the toggle mechanism for operating the heat units.
Fig. 9 illustrates the knife section associated with the heat units and operated by the toggle mechanism as shown in Fig. 8.
Fig. 10 is a detail end view showing the mechanism illustrated in Fig. 8.
Fig. 11 is a sectional view showing the sealing in the primary stage.
Fig. 12 is an illustration of the perfected bag sealer.
Fig. 13 shows the end of a bag exhibiting the indentations after sealing.
Figure 14:
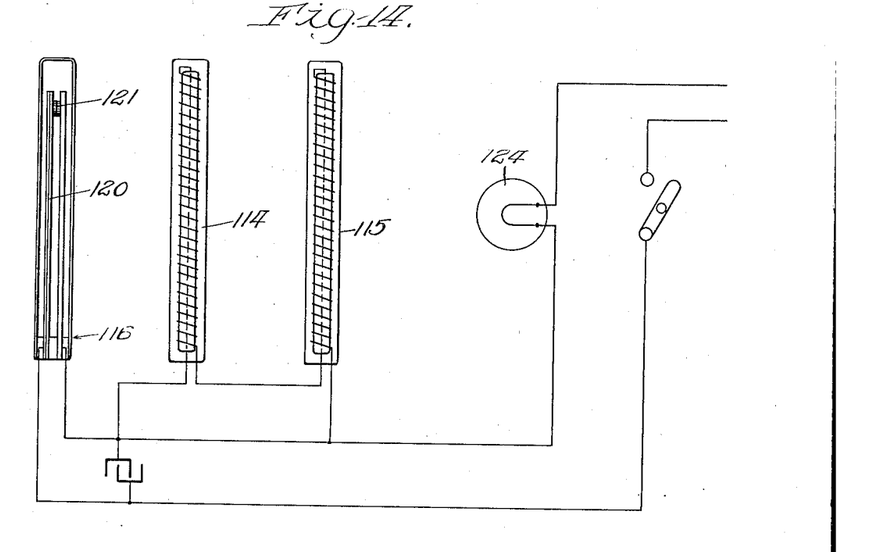
Fig. 14 is a diagrammatic presentation of the electrical heating units and automatic heat regulation.
Figure 15:
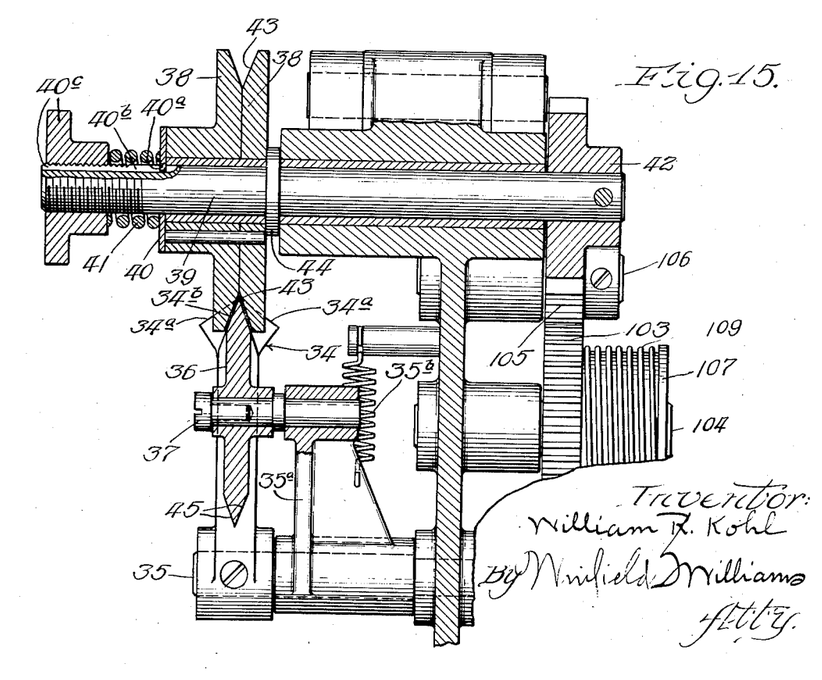
Fig. 15 is a sectional detail of the parts engaged in feeding and folding the sealing label.
Figure 16:
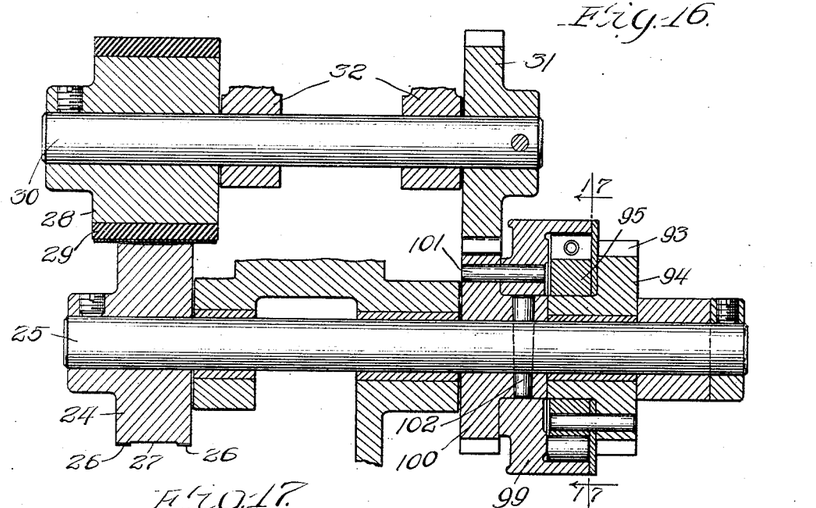
Fig. 16 is a sectional detail showing the paper advancing mechanism, and the mechanism for intermittently advancing the sealing strip or label.
Figures 17, 18, 19:
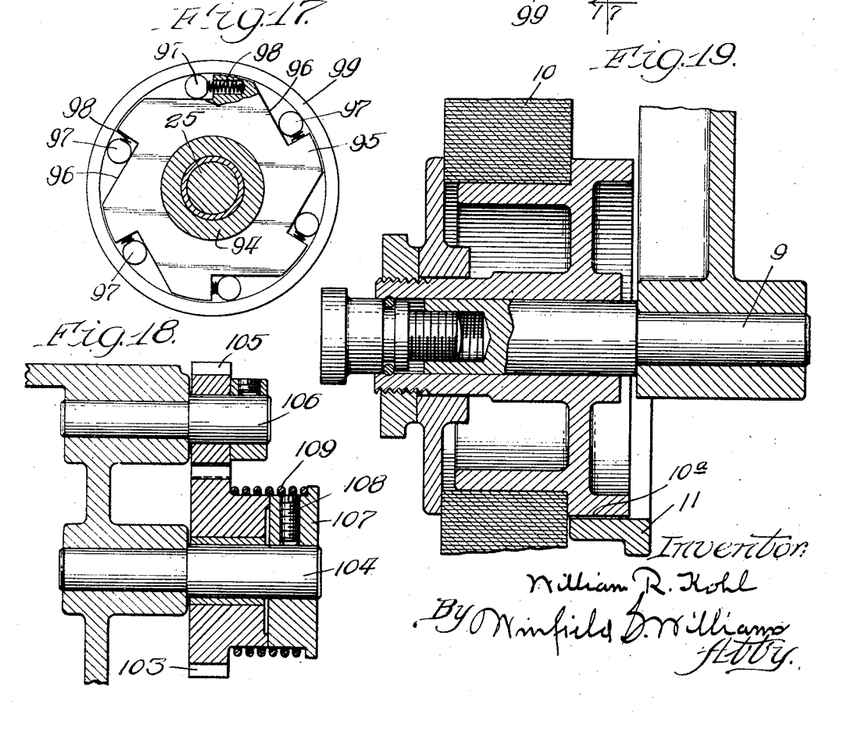
Fig. 17 shows a clutch mechanism for operating the members shown in Fig. 16.
Fig. 18 is an enlarged section of a portion of Fig. 5, showing the arrangements for driving the forming mechanism of the parts shown in Fig. 15.
Fig. 19 is a detail of the mechanism of the sealing assembly.

As illustrated, 1 is the supporting frame for the principal operative parts of the mechanism. 2 is a portion of a column containing the mechanism for regulating a clutch, and a trip-mechanism for regulating the clutch movement, which said clutch movement automatically advances the members controlling the delivery of the paper to be used in sealing bags. 3 is a column attaching the base to the upper operative portion of the device. 4 is the base support for the trip assembly. 5 is a pedal rotatively mounted at 6 and having means 7 and 8 to operatively connect pedal 5, rod 7, and yoke 7I. 9 is a shaft on which a roll 10 of prepared sealing material is mounted. 11 is a brake journalled on 12, its bearing on 10a tensioned by a spring 15 on a rod 13, said tensioning rod journalled on 14, there being a knurled nut 13a for altering the tension of the spring 15. 16 is an idler-roller journalled on 17. 19 is a roll journalled at 20 on 18, tensioned by a spring 21. 22 is a roller over which sealing paper passes which said roll is journalled at 23. 22a is an adjustable wall forming a guide directing paper coming from roll 19 just prior to its being drawn in by 24 journalled on 25. 26 is a milled face on 24 with a channel 27 between the two milled faces 26 and 26. 28 is a roller with frictional face 29 and fixed shaft 30. Shaft 30 journalled in yoke 32 swinging from 33 carries a gear 31. Tensioned by a spring 32, gear 31 meshes yet permits a certain clearance of movement between the face of 29 and the face 26 of the member 24, providing for variations in the thickness of the material passing therebetween. 34 is a form fixed on a shaft 35 having warped surfaces 34a adapted to begin a process of folding the stock as it comes from the combination of 24 and 28. As the material passes over 34, it begins to take an inverted V shape 34b, and in that form is drawn into a recessed pulley 45 having a rim 43 V shaped in radial section on a shaft 39. A forming disc 36 fixed to a shaft 37 swings somewhat freely on shaft 35 tensioned by a spring 35a provides for a certain variation of clearance for the V shaped circumference 45. 40 is a disc with a lug 40a adapted to set in a recess 40b in shaft 39 to position the wheel 38 on the shaft 39. A spring 41 adapted to press against the disc 40 has an adjustable nut 40c for tensioning the wheel 38 on shaft 39, providing for a certain amount of slippage. Gear 42 is positively fixed and is driven through an idling gear 105 by the gear wheel 103. 44 is a collar on shaft 39. 46 is one member of a shears positioned by screws 47 on a sealing member 51, the other shearing member 48 is fixed to a complementary sealing member 52 by a bolt 49, the blades 50 are adapted to cut the paper material 34b as it is advanced to a proper position for severance. 53 are parallel slide rods seated in channels 56 and joined by a yoke 54 with nuts 55. The said rods 53 are joined to a plate 55a by rivetted ends 55b, said plate demountably fixed to a sealing unit 52. The said assemblage 52, 53, 54, and 55 are attached by a connector 57 rotatably associated with a toggle assemblage composed of 58, 59 and 60. The member 59 has its bearing 62 and the member 60 has its bearing at 66 on a bell crank 64 rotatably mounted at 65. Fixedly associated with the member 59 is an arm 61 and attached thereto is a spring 62a, fixed at 63, and adapted to return the toggling members, rod 7 and draw member 52 to their initial position. 67 is a connecting element rotatably pendant at 68 on bell crank 64 which said member 67 has an extension rod 70 with a yoke 71 to which is attached a rod 7 forming part of the assemblage with the foot members 5, 6, 7, and 8, adapted for impelling the entire mechanism. 72 is a latch rotatably mounted on 73 and having at a substantially central point a boss 74 with latching end 69, said latch adapted to be raised by contact with the yoke 71 on its return after being drawn down to set the machine in operation. A pin 75 mounted in the yoke 71 moves in a slot 75a in a segmental gear 76, said gear rotatably fixed on a trunnion 77. The teeth 78 on the segmental gear 76 are adapted to mesh with the teeth on a segmental gear 80, which gear is fixed on shaft 79, also having a gear 81, which said gear 81 is adapted to mesh with a gear rack 82 upon a sliding member 82a. Gear 80 has a lever 83 which said lever 83 is adapted to be raised to an upright position where it will come into contact with the latch 72 at 69 on a downward draft of the connecting rod 7, at which time the latch 72 also comes into contact with stud 84, checking the progress of said latch which is automatically forced into connection with 83 by the spring 85. Simultaneously with the raising of the arm 83 to its latching by 72 an arm extension 87 of shaft 79 throws upward an arm 91 journalled at 90 on an adjustable member 88 set in position by 89 on 87, and simultaneous with this combined movement the member 82a is raised compressing the spring 86 against a buttress 86a causing a tension in said spring and the parts operating therewith to be held in positive position by the latch 69 in conjunction with the arm 83. On 91 is a rack 92 extending upward to a gear 93 on a clutch member 94 which clutch member 94 is journalled on one end of shaft 25. The circumference 95 of the said clutch being provided with triangular incisions around the said circumference in which each incision the long plane 96 has floating thereon a roller member 97 which is normally held in tension by a spring 98 inside of a frictional portion 99: this clutch member is adapted to operate freely in connection with the shaft in one direction only, and to automatically release in the opposite direction so that when the foot pedal is pressed down the member 91 is thrust upward without action upon the clutch other than a releasing movement: but when the foot lever is released the clutching takes place driving shaft 25 and automatically drawing the sealing material forward between 23 and 24 preparatory to delivery at the point of final action. Clutch 94 is demountably associated with a gear 100 by a stud 101, which said gear is fixed to the shaft 25 by a tapering pin 102. 103 is a gear rotatably positioned on a shaft 104 meshing with an idling gear 105 on a shaft 106. 107 is a disc having a circumferential shoulder on its outer edge positioned upon the shaft 104 by a set screw 108, with a spring 109 circumferentially around the surface of 103 and 107, held in tensional position between a wall on 103 and the circumferential shoulder on 107: this tensional arrangement is adapted to act upon the shaft 39 on which is assembled the creasing member 38, providing for a certain compensation in the passage of the paper being creased by the member 38 in the V channel 43 of the member 36. 110 is the framing with a central bracing support 111 in which is assembled a pair of sealing members 51 and 52, the outer sealing member 51 is fixed in the framing 110 and the member 52 is movable in the direction of the member 51. The member 51 has a demountable face plate 112, and the member 52 has a complementary demountable face plate 113 at the point where the two members 51 and 52 come together. In the member 51 there is assembled an electric heating unit 114, immediately adjacent to the face plate 112, with an electric thermostat 116 adapted to automatically control the temperatures, the said thermostat having its wire connection 120 in a junction box 125. The member 52 has immediately adjacent the face plate 113 a heat unit 115, with a lead wire 119, the said heating unit being a duplicate of the heat unit 114, the said units heating the face plates 112 and 113 similarly: the lead wires 118 and 119 receiving current in the junction box 125, mounted upon the frame of 110. The thermostat 116 connects in the junction box to a light 124, which signals when the temperature in the heating units is maintained at a predetermined point, the device being designed to indicate temperatures below a predetermined point by cutting in the light and adapted to cut off the light when the temperature is above a certain point in the face plates 112 and 113. These face plates are demountable and adapted to such changes as may be desired for the impressions being made upon the labels which are sealed by the operation of the machine.

It will be understood and appreciated that the device is shown in the drawings as operated by foot power, but the entire mechanism above the column 3 is adapted to be operated by power application—other than the base foot operation—simply by operating the connecting rod 7 by such applied power. It is also to be understood that whereas the drawings show a positioning of a single package—which may be positioned by hand—the operation of the invention can be applied to a conveyor system which will feed the bags automatically other than by individual operation of a foot lever. It will now be appreciated that the operation of the machine is as follows:

A roll—of such proportions as one may desire—of a strip material such as paper is mounted upon the machine for substantially continuous feeding. This strip is coated on one side of the material with a thermoplastic adhesive. When the rod 7—whether impelled by foot or other power—is drawn downward, it primarily accomplishes two things, the drawing of the compression members into action for compression while at the same time it sets into operation a mechanism which provides for a movement to advance a portion of the roll a definite predetermined distance there being constraining means to limit that advancement. This main activity of advancement is accomplished by means of a clutch, which said clutch only operates in one direction. When the compression and sealing is accomplished, the return of the connecting rod 7 to its initial position releases the clutch, which is regulated by a spring and when the clutch is released it immediately advances a new portion of the strip to a position over the bag to be sealed; simultaneously with the advancement of the strip to its operative position, the predetermined section is severed from the main strip. The compressing members are automatically maintained in temperature by an electric signal responsive to a thermostat immediately adjacent to the compression jaws, the said thermostat designed to operate at a specifically given minimum temperature, which is essential to the liquefying of the thermoplastic adhesive. Simultaneously with the closing of the compression jaws, the thermoplastic adhesive is fused between the folds of the severed sections of the strip and the sides of the bag adjacent to the opening to be sealed.

I do not limit myself to any specific description of any of the parts only in so far as I am limited by the scope of my claims.

I claim:

1. In a bag closing machine means for hermetically sealing the mouth of the bag comprising juxtaposed compression jaws co-acting simultaneously with a predetermined temperature in the jaws of said compression means adapted to cause a fusing of a dry thermoplastic adhesive coincident with the compression means to seal any object interposed between said jaws and the mouth of the bag by the combination of heat and pressure.

2. In a bag closing machine, compressing means comprising a pair of adjacently located members, one of which is fixed and the other movable in a plane with the fixed member; means for driving the movable member into compression relation with the fixed member, means for delivering between said members a label strip folded over a bag mouth, means to automatically regulate the temperature above a predetermined minimum temperature sufficient to fluidify an adhesive coating upon one face of the label strip.

3. In a machine for hermetically sealing the open mouth of a bag comprising a support for a label strip precoated with a dry thermoplastic cementitious substance; means for automatically presenting to the open end of a bag a section of the pre-coated strip in form to overlie an open end of the bag, means to press the sealing strip upon the bag between jaws of compression members, automatic means to heat the compression members at a predetermined minimum temperature sufficient to cause the fluidifying of the coating between the label and the bag.

4. A machine for the purposes described, whereby a pre-coated strip of paper is automatically fed to an open end of a bag in form to close said end of a bag, means for pressing the said strip upon the portion of the bag to be closed thereby, means simultaneous with the application of closing pressure to automatically heat the said closing members to a predetermined minimum temperature causing the said pre-applied coating to fuse between the strip and the bag to effect a hermetic sealing of the bag end by said label strip under heat and pressure.

5. In a machine of the character described, compression means comprising a pair of jaws, one of which is fixed and the other mechanically movable toward and in the plane of the fixed jaw, each of said jaws having means to be heated and maintain the heating thereof at predetermined minimum temperatures, means to intermittently place between said jaws over a bag mouth a label strip, means to bring the said jaws into such close relation as to compress the objects placed therebetween; means to automatically maintain a minimum temperature in each of the said compressing jaws whereby the strip having upon one face thereof a coating of thermoplastic adhesive may be acted upon to sufficiently fluidify said adhesive and effect a sealing of the objects placed between said jaws.

6. In a device for the purposes described means for drawing into said machine material adapted to sealing of bags, material having one side thereof coated with a dry thermoplastic adhesive, means for intermittently feeding from the said roll the said material into means for shaping the said sealing material into the form of an inverted V, means for intermittently shear cutting the said V shaped material into predetermined lengths, means for sealing the sheared portions onto bags or bag material by the combination simultaneously of pressure and predetermined temperature, the said temperature being adapted to automatically cause a flow of the thermoplastic cement to hermetically seal the parts to which the material is attached.

7. In a bag sealing machine the combination of a support for the rotatable mounting of an elongated strip of tape, one of dry the faces of which has been treated to a coating of thermoplastic adhesive, means to advance the said strip intermittently, one stage being the in-folding of the said strip, means to position the said strip over the end of a bag to be sealed between two members of a compression means, one of the same adapted to be advanced to a point of compressing the strip into a position over the mouth and on either side of the bag, and means to simultaneously heat the units of compression to melt the thermoplastic adhesive into the area between the inside portions of the strip to the outer portions of the bag ends being sealed.

8. A machine of the type described, a mounting for a substantially continuous roll of label material to which said label material a thermoplastic adhesive coating has been applied, a means for automatically delivering into said machine a definite pre-determined portion of said mounted roll, means for shaping the same in the course of the material thru the machine, means to deliver definite portions of said material at a point where severed portions are automatically placed upon an open end of a bag, and simultaneously applying to said label and the said bag predetermined temperatures sufficient to render the thermoplastic adhesive fluid, pressure means sufficient to perfect hermetical sealing of the said label upon a pre-determined portion of the said bag.

9. In a machine of the class described, means for applying adhesive tape over ends of bags to hermetically seal same, comprising a mounting for a roll of tape pre-coated on one side with a dry thermoplastic adhesive, means for advancing and guiding the tape intermittently to a point of forming the said tape into a substantially V-shaped form, the inner surfaces of the formed tape being the sides containing the adhesive, means at a point to deposit the tape over the end of the bag to be sealed, means to automatically heat the bag end and the tape to a temperature sufficient to fuse the adhesive, means adapted to advance a pressure closing the tape and the fused adhesive between the tape and the sides of the bag.

10. A machine of the class described, comprising means to rotatably mount a roll of strip label material having one face of said strip coated with a thermoplastic composition; means to advance the said strip intermittently predetermined distances, there being means to automatically control the advance of the said strip; means to shape the said strip into a substantial V form during its advancement adapting it to be placed over an open end of a bag; means to automatically sever the said strip in its travel into pre-determined lengths and place each severed portion over an open portion of a bag positioned between the compression members, compression means automatically heated to a pre-determined temperature to fuse the thermoplastic composition between the strip label and the bag simultaneously with the compression thereof.

11. A machine of the type described having means to mount a roll of label material, one side of said material being coated with a dry thermoplastic cementitious substance; means to intermittently draw from the said roll pre-determined portions of the said coated material and means associated therewith to limit the amount taken for each specific object to be sealed; means to shape the said material in its passage adapting it to be placed upon a bag to be sealed, means to separate from the body of said material at pre-determined moments sections of such shaped material as may be predetermined for the purpose of sealing, means to automatically place upon an open portion of a bag container the said formed section of sealing material, and means to simultaneously apply to said label and the said bag container closing pressure and heat of pre-determined minimum temperature adapted to render the thermoplastic substance sufficiently fluid to cause the hermetical sealing of that portion of the bag to which the sealing material is applied.

12. In a device for the purposes described means to deliver a creased label having a thermoplastic coating infolded over the mouth portion of a bag, means to hermetically seal the bag by heat and pressure.

13. In a machine of the character described means to center a label bearing a thermoplastic adhesive coating over the mouth end of a bag, means to bring a pair of opposed heated jaws into contact with the label and bag, and seal the same by heat and pressure.

14. In a machine of the class described means to place a partially folded label having its inturned surface coated with a thermoplastic adhesive over the mouth of a bag, means to seal said label in place over and adjacent to the mouth of the bag by the application of heat and pressure.

15. In a machine for the purposes described means to center a label with relation to a bag, means to move the centered label into a pre-determined position with relation to the bag, opposed heated jaws disposed on each side of the bag, means to operate said jaws whereby the label is sealed to the bag by the application of heat and pressure between said jaws.

16. In a device of the character described means to position a label bearing an infolded coating of thermoplastic adhesive over the mouth of a bag, opposed heated jaws disposed on each side of the bag mouth, means to force said jaws into pressure action and seal the label to the bag by the fusing of the thermoplastic adhesive and the pressure of the jaws.

17. In a device for the purposes described means to deliver over the mouth of a bag a pre-determined portion of material V-shaped its infolded sides bearing a coating of thermoplastic adhesive adapted to cover the mouth of the bag and a portion of its adjacent sides, means to seal the said material to the bag by heat fusion and pressure.

18. In a device of the character described a mounting to carry a roll of flexible material coated on one side with a thermoplastic adhesive, means to intermittently draw sections of said flexible material and shape the same into a substantially V-shape with the thermoplastic adhesive infolded, means to intermittently sever predetermined portions of said flexible material, means to deliver each severed portion over the mouth of the bag, means to seal the flexible material to the bag with heat and pressure.

WILLIAM R. KOHL.